US012290788B2

(12) United States Patent
Wu

(10) Patent No.: US 12,290,788 B2
(45) Date of Patent: May 6, 2025

(54) CONCENTRATE FILLING SYSTEM

(71) Applicant: Clear IP Corporation, Stafford, TX (US)

(72) Inventor: Jeff Wu, Stafford, TX (US)

(73) Assignee: Clear IP Corporation, Stafford, TX (US)

( * ) Notice: Subject to any disclaimer, the term of this patent is extended or adjusted under 35 U.S.C. 154(b) by 159 days.

(21) Appl. No.: 17/882,265

(22) Filed: Aug. 5, 2022

(65) Prior Publication Data

US 2024/0044693 A1 Feb. 8, 2024

(51) Int. Cl.
*G01G 13/24* (2006.01)
*B01F 23/00* (2022.01)
*B65B 1/08* (2006.01)
*G01G 13/02* (2006.01)
*G01G 19/24* (2006.01)

(52) U.S. Cl.
CPC .............. *B01F 23/06* (2022.01); *B65B 1/08* (2013.01); *G01G 13/026* (2013.01); *G01G 13/248* (2013.01); *G01G 19/24* (2013.01)

(58) Field of Classification Search
CPC ......... B01F 23/06; B65B 1/08; G01G 13/026; G01G 13/248; G01G 19/24
See application file for complete search history.

(56) References Cited

U.S. PATENT DOCUMENTS

| | | | | |
|---|---|---|---|---|
| 2,687,272 A * | 8/1954 | Schieser | ............... | G01G 13/32 177/121 |
| 4,015,645 A * | 4/1977 | Chamberlin | ............. | B65B 1/30 141/34 |
| 4,521,116 A * | 6/1985 | Adsit | .................... | B01F 29/401 366/54 |

(Continued)

FOREIGN PATENT DOCUMENTS

DE    2425882 A1    12/1975
GB    1459394 A     12/1976

OTHER PUBLICATIONS

International Search Report and Written Opinion for PCT Application No. PCT/US2023/071675, mailed Dec. 11, 2023, 11 pages.

(Continued)

*Primary Examiner* — Nicolas A Arnett
(74) *Attorney, Agent, or Firm* — Polsinelli PC

(57) ABSTRACT

Concentrate filling system includes a solid loader operable to dispense particles through a dispensing end. The system includes a conveyer operable to receive the dispensed particles at a proximal end and further dispense particles at a distal end. The system includes load cell operable to receive a container that receives the dispensed particles. The system includes an injection pump to dispense fluids into the container. The system includes controller operable to receive data from the load cell indicative of a weight of the particles and/or fluid and send a control signal to the conveyor to adjust the dispensing of the particles and send a control (Continued)

signal to the injection pump. Upon receiving indicative of a predetermined weight of the container, fluid, and particles, the controller is operable to send a control signal to the conveyor and the injection pump to stop dispensing of particles and fluid.

17 Claims, 15 Drawing Sheets

(56) References Cited

U.S. PATENT DOCUMENTS

| | | | |
|---|---|---|---|
| 4,913,198 A * | 4/1990 | Hayahara | G05D 11/134 |
| | | | 141/237 |
| 9,820,615 B2 * | 11/2017 | Jin | G07F 13/065 |
| 11,040,787 B2 * | 6/2021 | Smith | B65B 39/005 |
| 11,345,491 B1 * | 5/2022 | Wagner | B65B 1/32 |
| 2011/0026015 A1 * | 2/2011 | Mimeault | G01S 7/4866 |
| | | | 356/139.1 |
| 2017/0042383 A1 * | 2/2017 | Jin | B65B 3/26 |
| 2024/0043148 A1 | 2/2024 | Wu | |
| 2024/0067372 A1 | 2/2024 | Wu | |

OTHER PUBLICATIONS

Cynthia, "My Favorite Cooking Tools", (Chic Eats), Nov. 14, 2019, retrieved from the Internet Oct. 27, 2023: <https://chiceats.com/blog/kitchen-equipment/my-favorite-cooking-tools> entire document.

Non-Final Office Action for U.S. Appl. No. 18/128,837, dated Sep. 5, 2024, 16 pages.

* cited by examiner

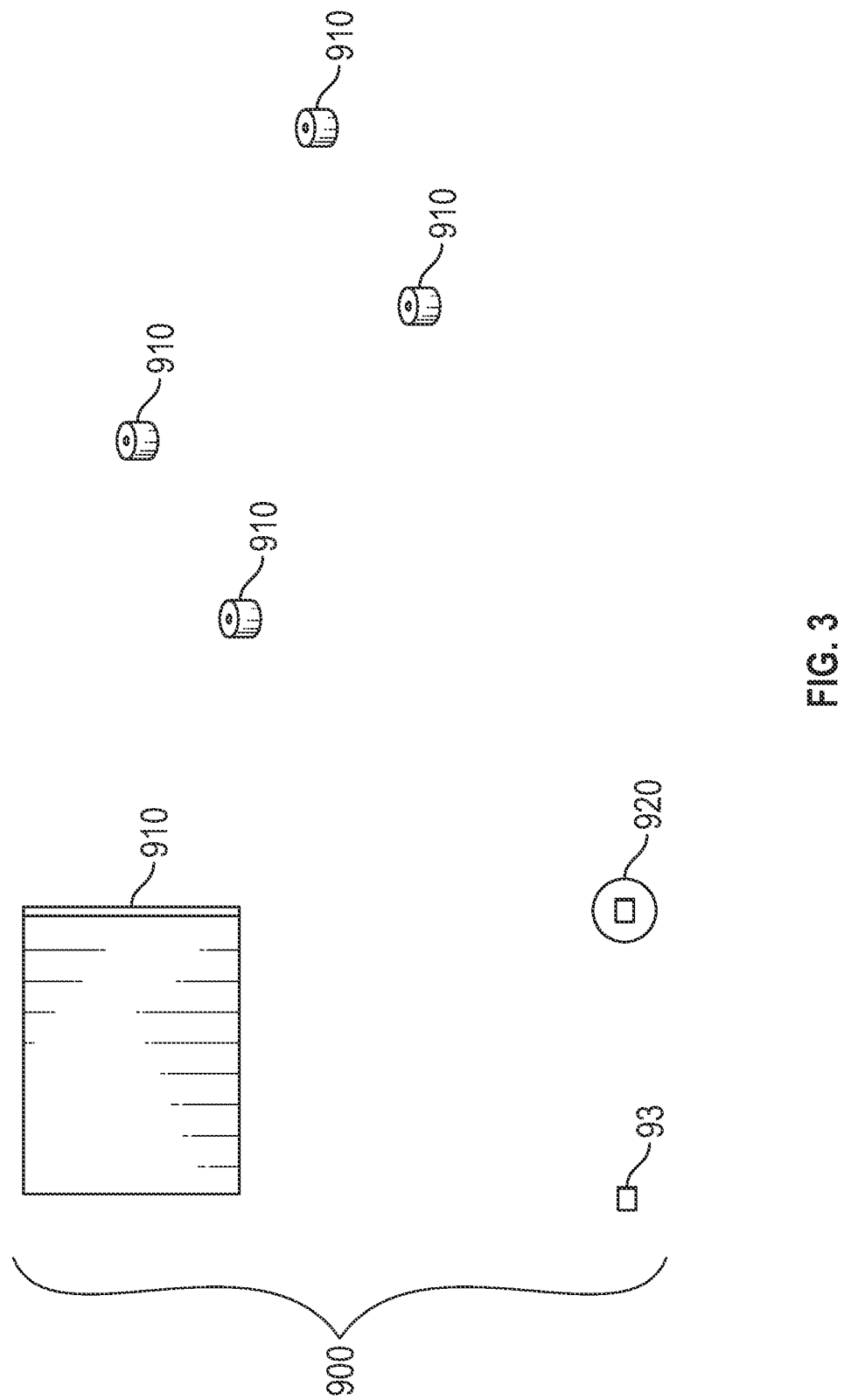

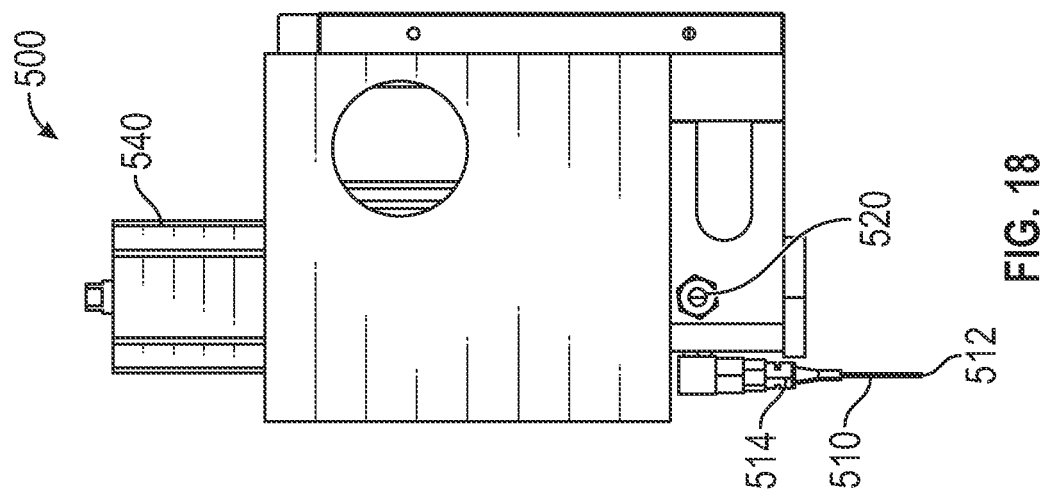
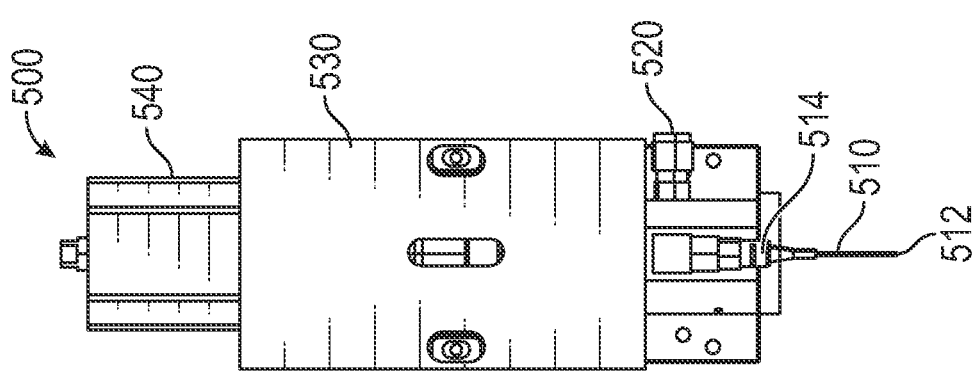

CONCENTRATE FILLING SYSTEM

TECHNICAL FIELD

The present disclosure relates generally to systems and techniques for filling concentrate jars.

BACKGROUND

Since the legalization of hemp and related products in the USA many formants of consumption have arisen. Vaporization, edibles, and topicals are all delivery methods for ingestion. The creation of hemp and related concentrates have created a market for high potency products that can either be pyrolyzed or ingested which are particularly popular for medical and chronic pain patients. This market demand has created a supply chain struggling to supply products due to the difficult and often hard-to-package concentrate product that is sold by the gram.

Concentrates derived from hemp and related plants are separated into 3 varieties: 1) "Diamonds with sauce"—this material is a crystallized concentrate with a terpene layer; 2) Shatter—this material is dried while wet to form a "brown sugar brittle" style of material; 3) Batter—this material look and flows like dense cookie batter. All these materials are difficult to package either due to a solid and/or liquid component or uneven grain size.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understand that these drawings depict only exemplary embodiments of the disclosure and are not, therefore, to be considered to be limiting of its scope, the principles herein are described and explained with additional specificity and detail through the use of the accompanying drawings in which:

FIG. 3 illustrates adjustment feet for an example concentrate filling system assembly;

FIG. 17 illustrates a perspective view of an injection pump;

FIG. 18 illustrates a front elevational view of an injection pump;

DETAILED DESCRIPTION

Figure 1:
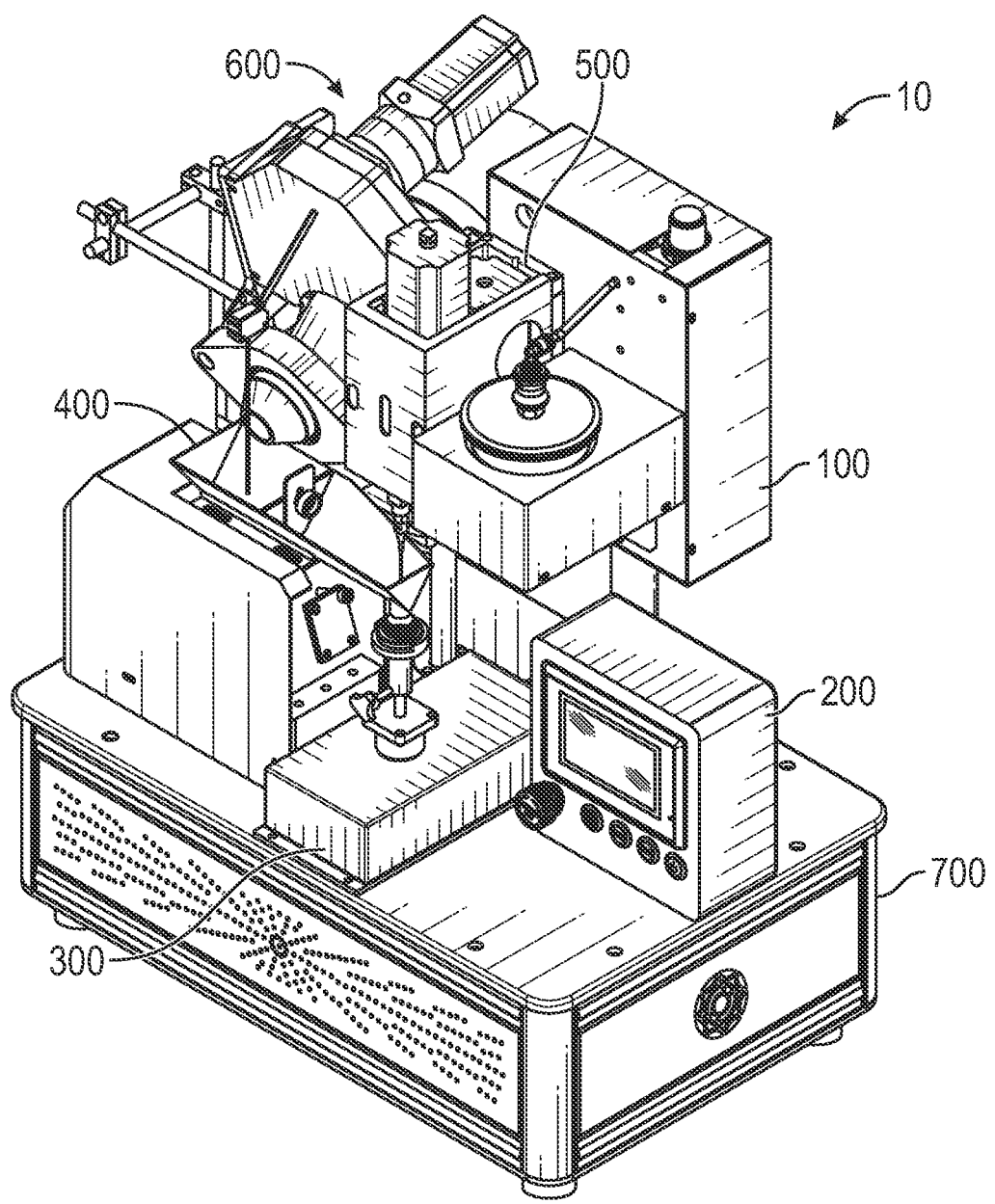
FIG. 1 illustrates a perspective view of an example concentrate filling system assembly.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure. Additional features and advantages of the disclosure will be outlined in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

FIG. 1 illustrates a perspective view of an example concentrate filling system 10. In at least one example, the concentrate filling system 10 is used to dispense accurate amounts of solids and/or liquids in predetermined ratios to container 800. Container 800 can be a special purpose jar or a commercially available jar. The concentrate filling system 10 contains a solid loader 600. In one example, the solid loader 600 can be of a rotational design. In other examples, the solid loader can include one or more vibratory mechanisms or conveyor belts to move solid particles. The solid loader 600 dispenses solid particles to a conveyor 400. The conveyor 400 can be configured for precision dispensing to a container 800 on the load cell 300. The conveyor 400 can have a shape that resembles a trough which allows the particles to channel into a dispensing port 416 at the end 424. The injection pump 500 can be configured to dispense terpene fluids stored in the oil reservoir 100 to container 800. While the conveyor 400 and injection pump 500 are operating, the load cell 300 can determine the total weight in real-time. The controller 200 can receive data indicative of the total weight and send a signal to stop the injection pump 500, conveyor 400, and solid loader 600. The controller 200 can be a PLC or Computer system with an interface. Additional details about the oil reservoir 100, controller 200, solid loader 600, conveyor 400, container 800, load cell 300, and injection pump 500 are given below with respect to the additional figures.

Figure 2:
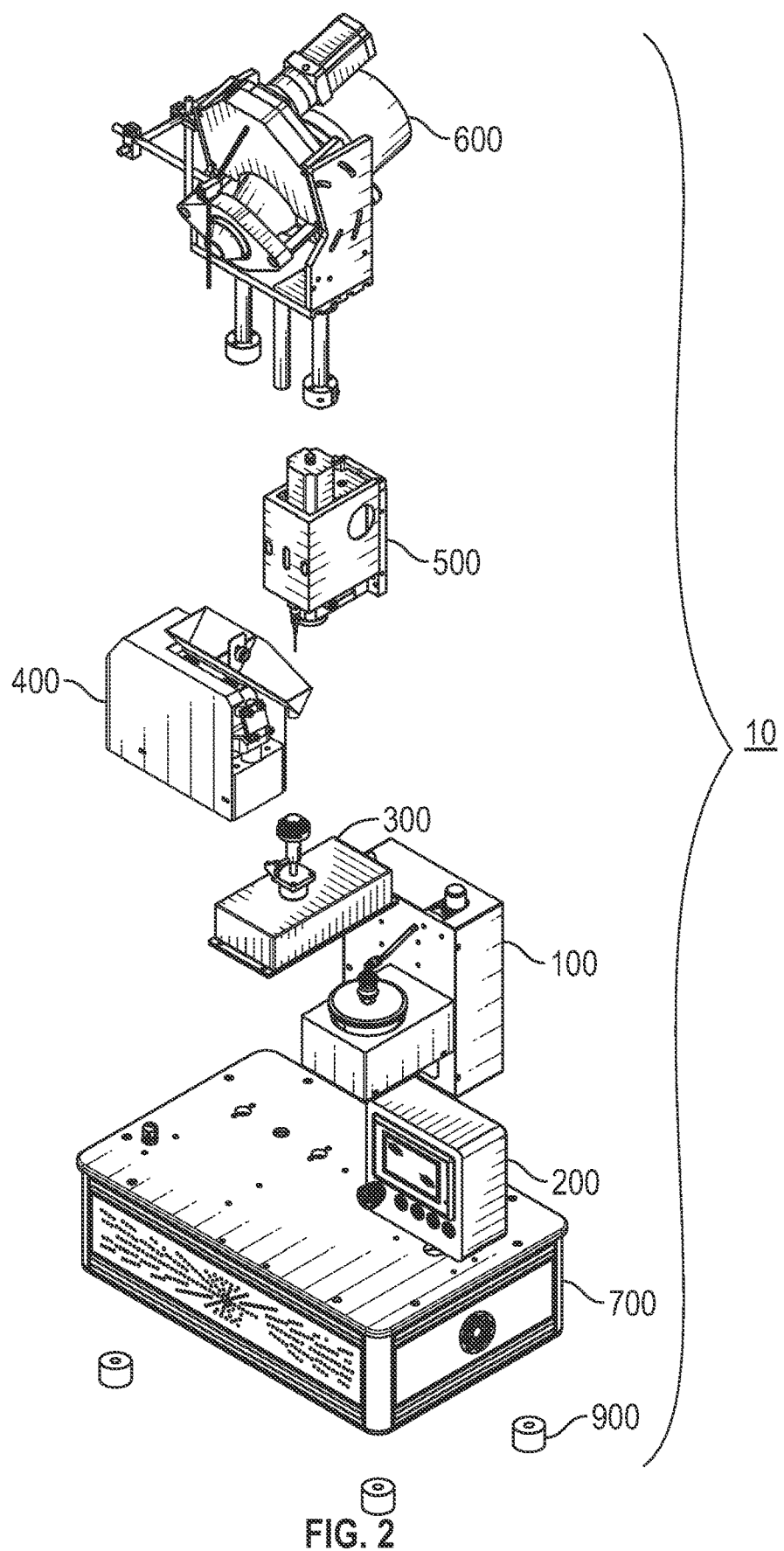
FIG. 2 illustrates an exploded view of an example concentrate filling system assembly.

FIG. 2 illustrates an exploded view of an example concentrate filling system 10. As illustrated, the concentrate filling system 10 can have a base 700. The base 700 can be sized to be placed on a tabletop (not shown). The base 700 in other implementations can be floor mounted. The controller 200 can be coupled with the base 700. In other examples, the controller 200 can be wirelessly coupled to the components and separate from the assembly. The oil reservoir 100 can be coupled to the base 700. The oil reservoir 100 can be omitted when the concentrate filling system 10 is implemented without a separate fluid filling component such as the injection pump 500. The oil reservoir 100 stores oils that can be added through the injection pump 500. The oil reservoir 100 can include one or more heating and/or cooling components to control the temperature of the oil in the oil reservoir 100.

The concentrate filling system 10 includes a load cell 300. The load cell 300 can be operable to be zeroed using a container 800. Container 800 can be filled by the injection pump 500 in a systematic way so that a density of the particles that are within the container 800 can be measured. The conveyor 400 can also be coupled to base 700. The injection pump 500 can be coupled to the oil reservoir 100. In other examples, the injection pump 500 can be coupled directly to the base 700. The oil reservoir 100 is also fluidically coupled with the injection pump 500 such that fluid can flow from the oil reservoir 100 to the injection pump 500 and thereby be dispensed from the injection pump 500 into the container 800.

The solid loader 600 can also be coupled to the base 700. By having all of the components coupled to the base 700, the concentrate filling system 10 can be designed to be installed within an existing facility on a tabletop.

In at least one example, the concentrate filling system 10 can be designed and assembled prior to shipping. In another example, the load cell 300 can be separated and packaged together with, but physically not assembled with the other components of the concentrate filling system 10. Additionally, the controller 200 can be arranged to be mounted directly to the base 700 as shown. In other examples, the controller 200 can be mounted on a stand and/or located on the back side of the base 700.

FIG. 3 illustrates a plurality of adjustment feet 900 for an example concentrate filling system 10. Each adjustment foot 900 can include a first component 910 that provides for the main height control, a second element 93, and a third element 920. The adjustment feet 800 can be such that they are coupled to an adjustment mechanism on the base 700 and can be extended away from or towards the base 700. The plurality of adjustment feet 900 are operable to be adjusted thereby leveling the load cell 300 that is coupled to the base 700. Normally, only the main adjustment control portion 910 is visible.

Figure 4:
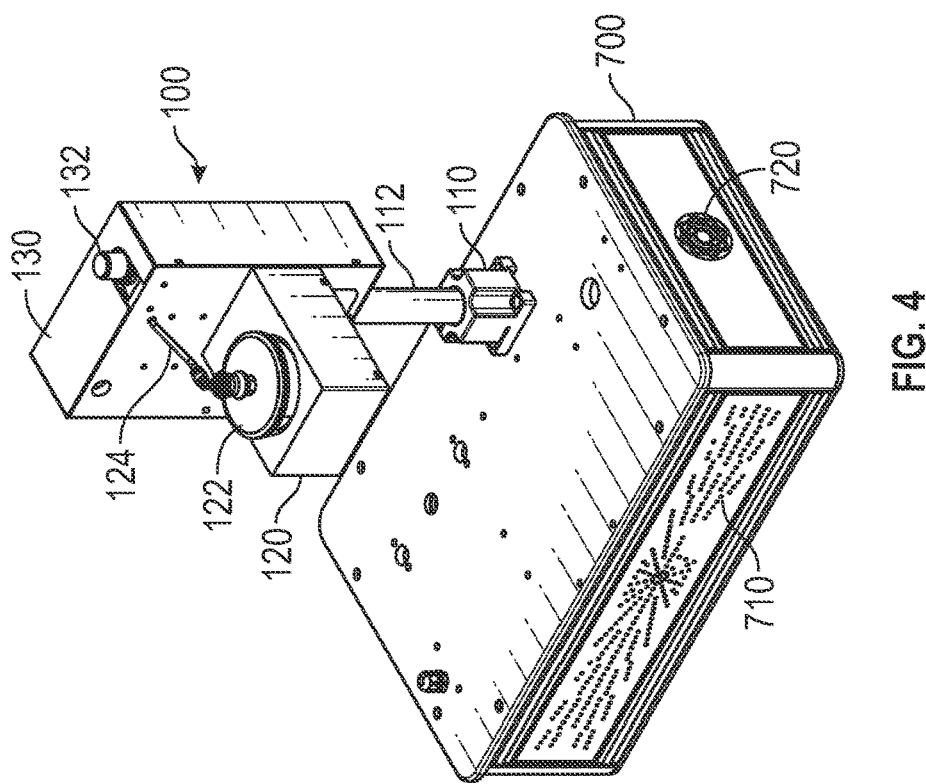
FIG. 4 illustrates a perspective view of an oil reservoir coupled to a balancing base.

FIG. 4 illustrates a perspective view of an oil reservoir 100 coupled to a base 700. The base 700 can function as a balancing base in that the base 700 serves to balance the components and provide some stability as the various components move, operate, and/or vibrate. The base 700 can have a plurality of openings formed on a first side 710. Furthermore, the base 700 can have a fan opening formed on a second side 720. The oil reservoir 100 can be coupled to the base by an oil reservoir mounting component 110. The oil reservoir mounting component 110 can be configured to be bolted or otherwise attached to the base 700. An oil reservoir mounting rod 112 can extend from the oil reservoir mounting component 110. In at least one example, the oil reservoir mounting rod 112 can be formed separately and attached to the oil reservoir mounting component 110. In another example, the oil reservoir mounting rod 112 can be formed with the oil reservoir mounting component 110. The oil reservoir mounting rod 112 can be coupled to an oil reservoir storage component 130 that includes an oil reservoir fill 132. The oil reservoir fill 132 can be operable to receive terpene oil or other oils for further dispensing by the concentrate filling system 10 into a container 800. In at least one example, the oil reservoir storage component 130 can include a heater to keep the oil above a desired temperature to assist with dispensing as some of the oils used might be slow flow type oils that dispensing at room temperature would take a long time to dispense. A connection tube 124 extends from the oil reservoir storage component 130 to an oil dispensing component 122 that is mounted within a dispenser holder 120. The dispenser holder 120 can be coupled directly to the oil reservoir storage component.

Figure 5:
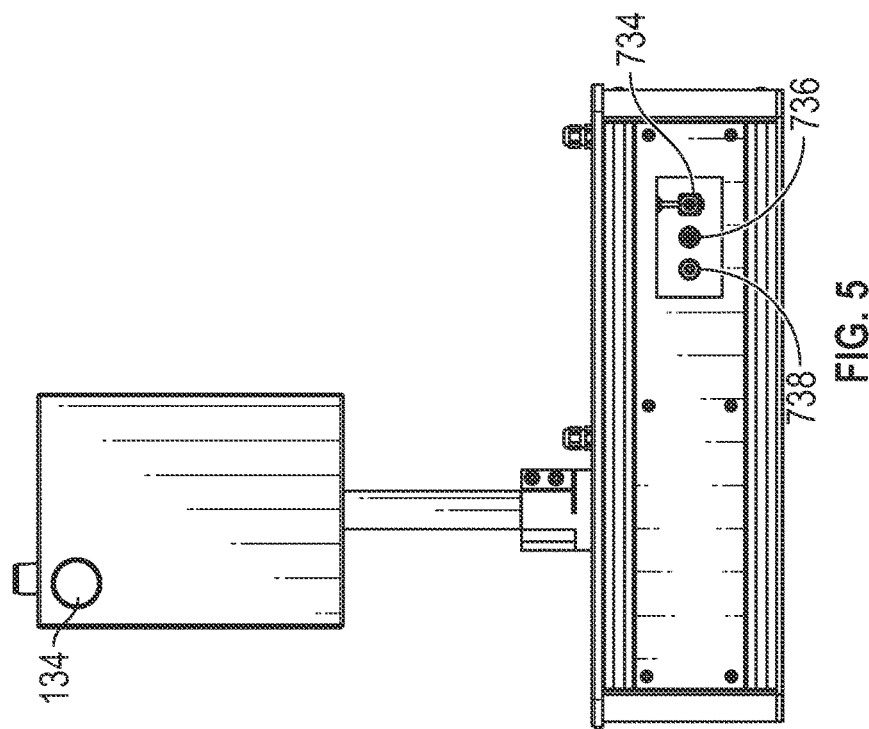
FIG. 5 illustrates an elevational view of an oil reservoir coupled to a balancing base.

FIG. 5 illustrates a right-side elevational view of an oil reservoir 100 coupled to a base 700. An opening 134 is formed on the right side of the oil reservoir 100. The opening 134 allows an operator to see through the outside of the oil reservoir 100 into an internal container. The internal container can be formed such that is removable from the oil reservoir 100. Additionally, the base 700 has a plurality of connectors 734, 736, 738 that are configured to receive different types of data and/or power cords. In additional examples, the base 700 can include a vibrational controller that is coupled with the conveyor 400. In other examples, the vibrational controller can be integrated with the controller 200. The vibrational controller can adjust the vibrational frequency in dependence upon a detected weight at the load cell 300.

Figure 6:
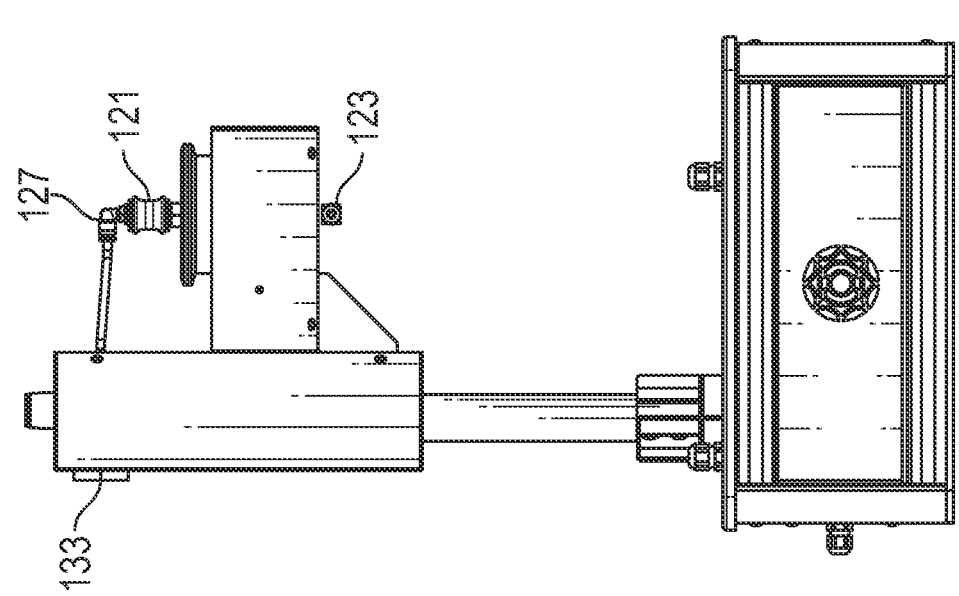
FIG. 6 illustrates a side elevational view of an oil reservoir coupled to a balancing base.

FIG. 6 illustrates a left-side elevational view of an oil reservoir 100 coupled to a base 700. The oil reservoir 100 includes protrusion 133 that couples the internal reservoir to the housing. Additionally, the oil reservoir 100 includes a coupler 127 and flow regulator 121. The fluid is dispensed through pump connector 123 operably coupled to the injection pump 500.

Figure 7:
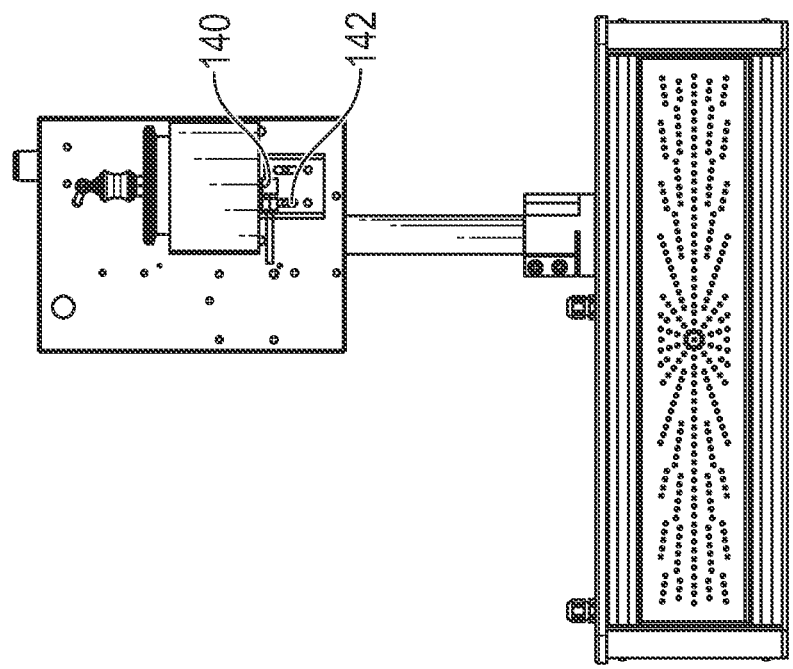
FIG. 7 illustrates a front side elevational view of an oil reservoir coupled to a balancing base.

FIG. 7 illustrates a front-side elevational view of an oil reservoir 100 coupled to a base 700. The oil reservoir 100 includes bracket 140 that is operable to couple the dispenser holder 120 to the oil reservoir storage component 130. The oil reservoir 100 further includes a dispenser hose 142.

Figure 8:
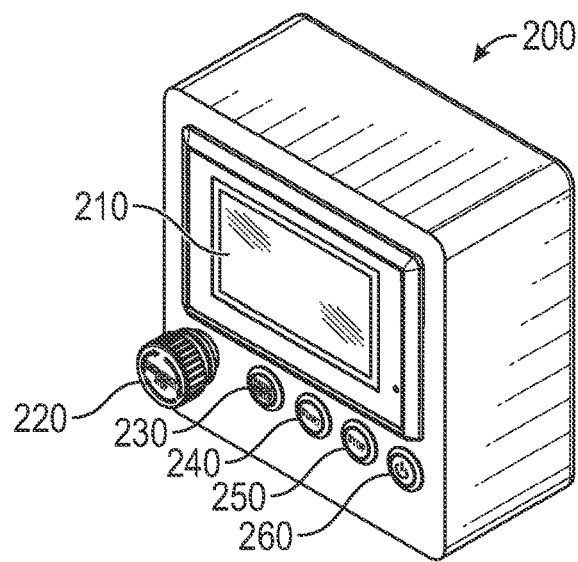
FIG. 8 illustrates a perspective view of a controller.

FIG. 8 illustrates a perspective view of a controller 200. The controller 200 can have one or more microprocessors. Additionally, controller 200 is operable to receive data from the load cell indicative of the weight of the particles and/or fluid and send a control signal to the conveyor to adjust the dispensing of the particles and send a control signal to the injection pump. As illustrated, the controller 200 includes a display screen 210. The display screen 210 is operable to display information including the weight of the container 800 including the contents. Furthermore, the display information can include system settings, density, cycle time, fill settings, solid settings, and heat settings. The controller 200 can include an emergency stop button 220 that is operable to stop all operations simultaneously. Additionally, the controller 200 can include a reset button 230 that can cause the controller 200 to reset all data within the controller 200 to original settings. In other examples, the reset button 230 can be in the form of a pause button that allows the operation to be paused and resumed later. Furthermore, controller 200 includes a start button 240 to start the filling process. Still further, the controller 200 includes a stop button 250 that stops the process. The controller 200 can also include a power button 260 that turns the controller 200 off.

Figure 9:
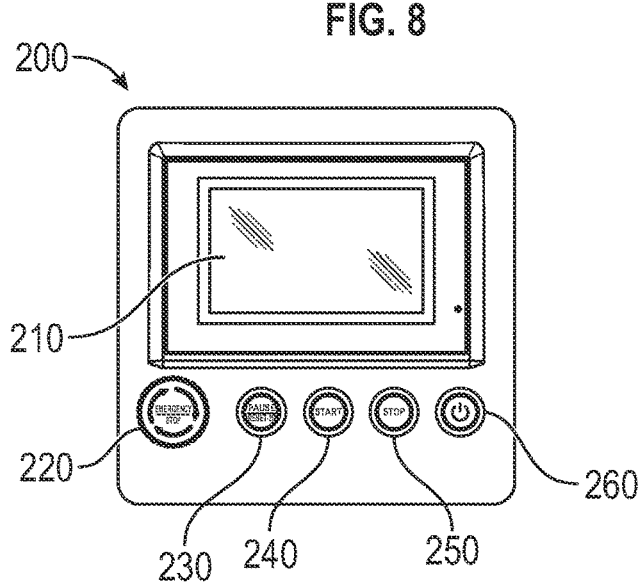
FIG. 9 illustrates a front elevational view of a controller.
Figure 10:
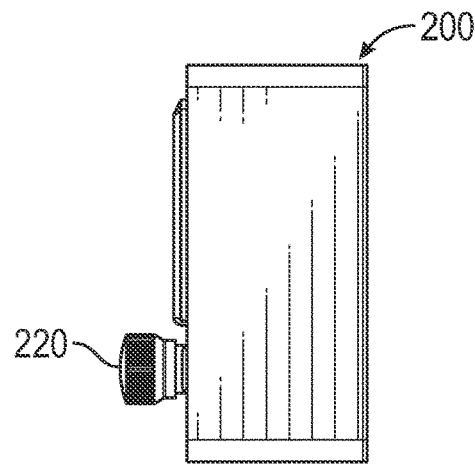
FIG. 10 illustrates a side elevational view of a controller.

FIG. 9 illustrates a front elevational view of a controller 200 that illustrates the emergency stop button 220, reset button 230, start button 240, stop button 250, and power button 260. FIG. 10 illustrates a left side elevational view of a controller 200 in which the protrusion of the display screen 210 and emergency stop button 220 are illustrated.

The controller 200 is operable upon receiving indicative of a predetermined weight of the container, fluid, and particles the controller is operable to send a control signal to the conveyor and the injection pump to stop dispensing of particles and fluid. Additionally, controller 200 is operable to receive data indicative of the height of the particles and cause the solid loader to dispense solid particles once the height of the particles is below a predetermined amount.

Figure 11:
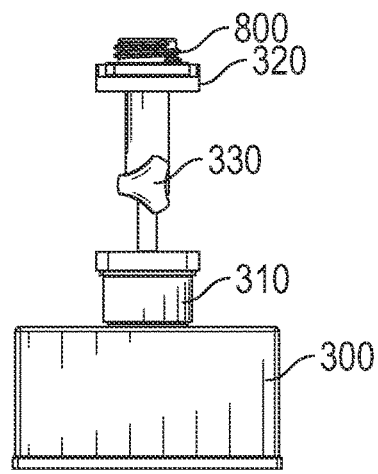
FIG. 11 illustrates a perspective view of a load cell component.
Figure 12:
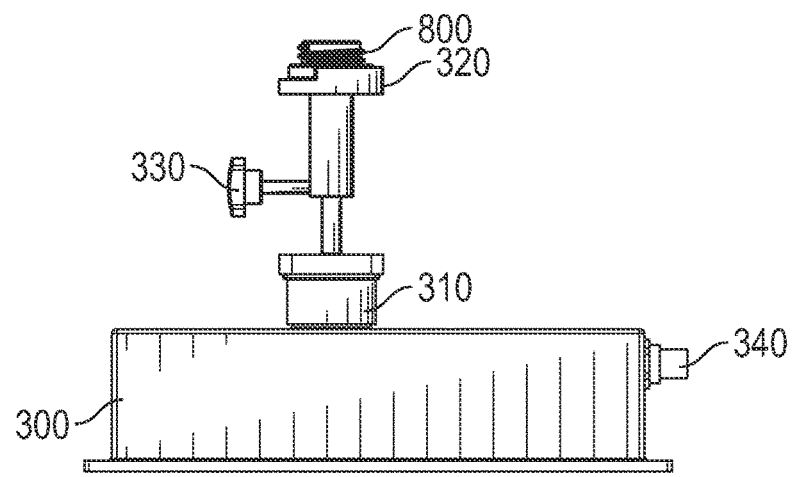
FIG. 12 illustrates a front elevational view of a load cell component.

FIG. 11 illustrates a perspective view of a load cell 300. FIG. 12 illustrates a front elevational view of a load cell 300. The load cell 300 is operable to receive a container 800. Container 800 receives the dispensed particles from the conveyor and/or fluid from the injection pump 500. The load cell 300 can be configured with different attachment dies 320 designed to properly seat different containers on the load cell 300. The attachment dies 320 can be secured to the load cell using an affixment device 330. The attachment dies 320 allow for the container to be quickly centered thereby allowing for accurate measurements by the load cell 300. In at least one example, the affixment device 330 can be a screw that connects to the load cell 300. Additionally, the load cell includes platform 310 and port 340. Port 340 can be coupled to a cord that is operable to transfer data and/or power to the load cell 300 and/or from the load cell 300. The platform 310 can be operable to receive the attachment dies 320 which allow for accurate centering of mass for weight measurement.

The load cell 300 is operable to move in response to one or more signals from the controller and take additional measurements and send additional measurement data to the controller, which is operable to determine a density of a mixture in the container. In at least one example the movement of the load cell 300 is a series of four strokes.

Figure 13:
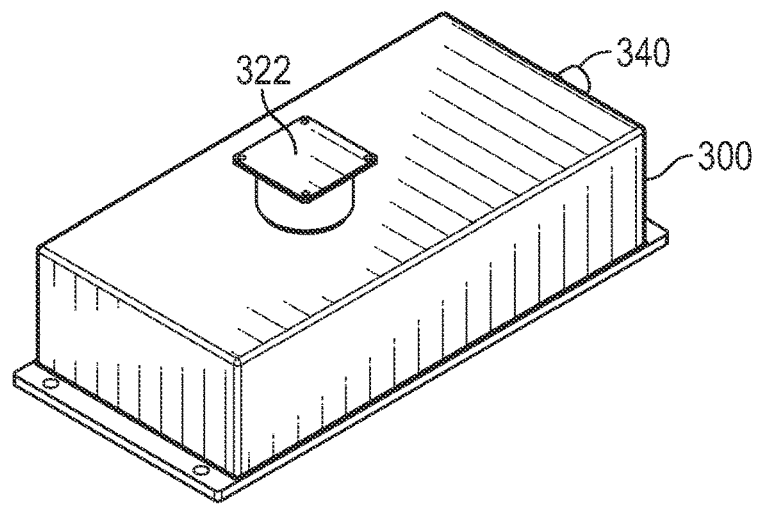
FIG. 13 illustrates a perspective view of a conveyor.

FIG. 13 illustrates a prospective view of another load cell 300. The load cell 300 includes a platform 322 to which different types of attachment dies 320 can be coupled thereto. In other examples, the platform 322 can be used directly to put a container on. Dies can also be shaped to specific containers to allow for faster loading and unloading. In some examples, the containers can be shaped differently such as a square shape or hexagonal shape. In those examples, different shape dies can be implemented. Furthermore, some dies can be shaped that allow for a variety of different containers.

FIGS. 14A, 14B, 15, and 16 illustrate a conveyor 400. The conveyor 400 includes a body 402 that houses machinery to cause a trough 410 to move and/or vibrate. The trough 410 has a proximal end 422 and a distal end 424. In at least one example, the trough 410 is metal. In another example, the trough 410 is a metal that is coated with a coating that allows for the particles to move easier as compared to uncoated metal. In other examples, the trough 410 can be lined with another material for example wax paper. The conveyor 400 is operable to receive the dispensed particles at the proximal end 422 and further dispense particles at a distal end 424. The distal end 424 can include a dispensing port 416 that is operable to dispense the particles into container 800. In at least one example, the conveyor 400 trough 410 is operable to vibrate thereby causing particles inside the conveyor 400 to travel down a length to a dispensing port 416 and into a container 800. In at least one example, the trough 410 can be divided by a separator 426 that includes a gate 427 that is adjustable relative to the separator 426 and coupled to the separator 426 by fastener 428. The separator 426 divides the trough 410 into a first side 412 and a second side 414. The separator 426 can hold back particles having a height greater than a predetermined height. In at least one example, the height of the particles that pass through separator 426 can be adjusted by adjusting gate 427. In another example, the separator 426 can be in the form of a screen or mesh that has predetermined sizes of openings. The openings can be sized to allow certain sizes of particles through and break up larger particles with the vibrations. An anti-static pad 430 can extend from the body 402 thereby allowing for external coupling to the static paid with the body in place.

Figure 14A:
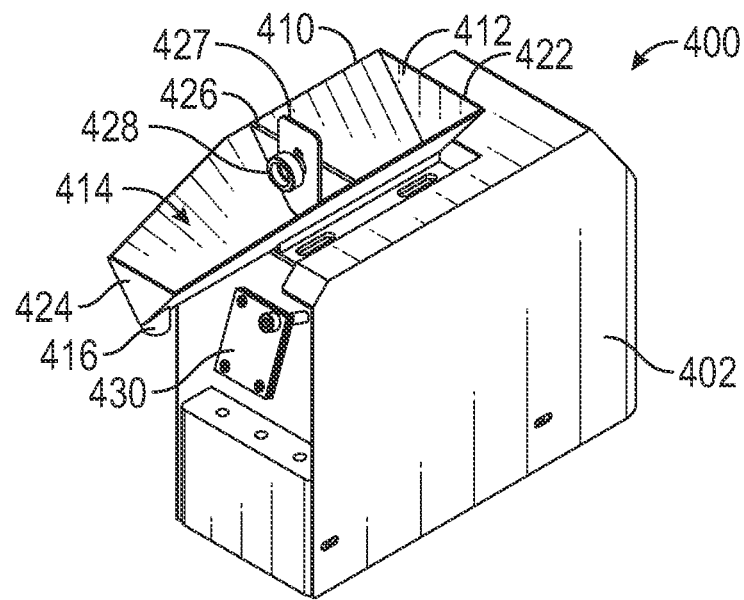
FIG. 14A illustrates a perspective view of a conveyor.
Figure 14B:
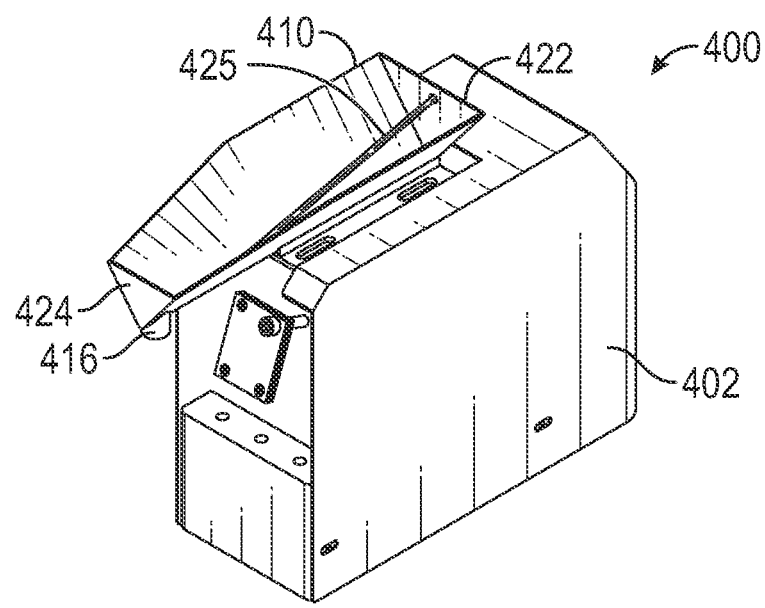
FIG. 14B illustrates a perspective view of a conveyor.

As illustrated in FIG. 14B, conveyor can be configured with a grate (not shown) and a share 425 which can be in the shape of a rod designed to break up and disperse large clumps or particles. The share 425 can be a small diameter rod that has a diameter on the order of the desired particle size. The share 425 can be used in conjunction with the vibrates generated by the conveyor 400 to separate the particles. The particles impact the share 425 and then the clumps of particles are separated into smaller clumps by the share 425 and the vibrations. It is important to have smaller clumps in order to achieve accurate filling of the container 800. If the clumps are too large, the weight of the particles will exceed the intended target. The controller 200 can be programed to have a desired filling of the container 800 with a predetermined weight of the particles and an overall weight with the liquid that is added by the injection pump 500 as described in the next paragraphs. If the weight of the particles exceeds the intended target, then the amount of liquid that is added will be less than the intended target. Thus, implementation with the desired share either in the form of a gate as described in regards to 14A or the share 425 in the form of the rod in FIG. 14B can be implemented based upon the particular types of particles so as to reduce the particle size exiting through the dispensing port 416.

Additionally, the controller 200 can be programmed to provide different signals to adjust the vibration of the conveyor 400. In one example, the controller 200 can be programmed to adjust the vibrational frequency of the conveyor 400, so that the conveyer can vibrate at different frequencies. In another example, a separate controller can be used to adjust the vibrational frequency of the conveyor 400. In one example, the vibrational frequency can be set at a single frequency. In another example, the vibrational frequency can change during the filling of the container 800. For example, the vibrational frequency can start off at a higher frequency and transition to a lower frequency as the container 800 is filled. The adjustment of the vibrational frequency can be made in response to data received from the load cell indicating the weight of the particles in the container. In other examples, two different sizes of particles can loaded into separate solid loaders 600 and fed into separate conveyors 400. The separate conveyors 400 can be controller through different vibrational frequencies and with different shares. In one example, each solid loader 600 would be operated separately until the desired amount of the first particle size was reached. Then the second solid loader would be operated with the respective conveyor until the second particle weight was reached. In some examples, only particles can be filled into the containers 800 and in other examples, bot particles and liquid can be filled into the containers 800.

Furthermore, the conveyor 400 can be coated with different types of coatings to allow the particles to more easily slide along the trough 410. In other examples, a separate layer such as a wax paper can be installed inside the trough 410 to facilitate the movement of particles along the trough 410.

Figure 15:
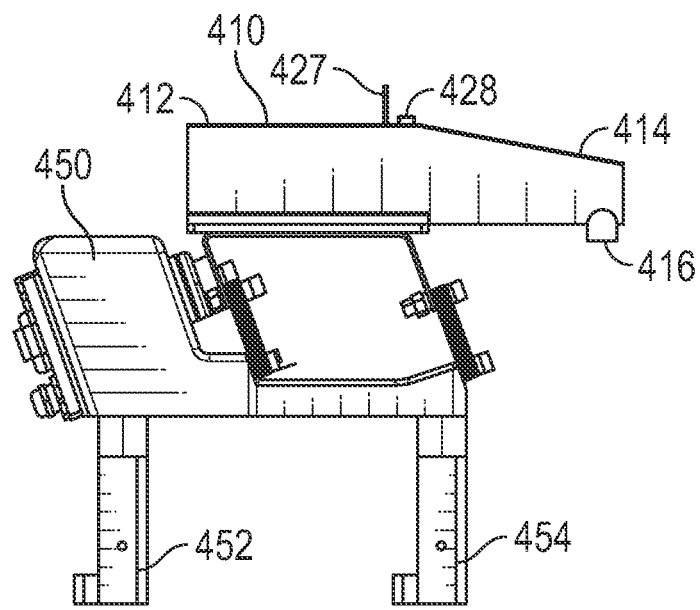
FIG. 15 illustrates a front elevational view of a conveyor.

FIG. 15 illustrates the conveyor 400 with the body 402 removed. As illustrated, the conveyor includes a first leg 452 and a second leg 454 that couples the conveyor 400 to the base 700. The first leg 452 and second leg 454 can include vibration isolation components operable to prevent vibrations from being transferred to the base 700. Additionally, the conveyor 400 includes a vibrational motor 450 that causes the trough 410 to vibrate.

Figure 16:
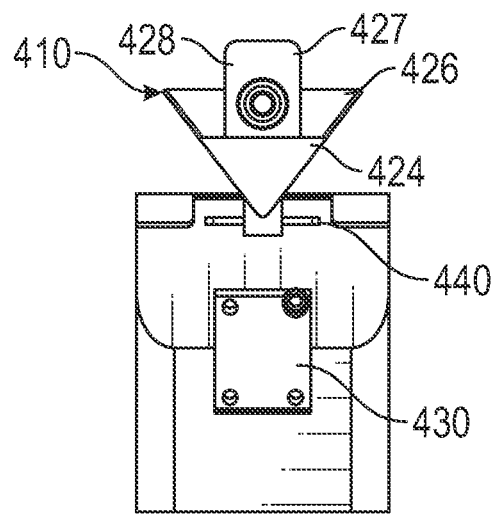
FIG. 16 illustrates a side elevational view of a conveyor.

FIG. 16 illustrates the shape of the trough 410 as seen from a side elevational view facing the distal end 424 of the trough 410. Additionally, the body 402 can form a slot 440 that allows for the trough 410 to vibrate freely.

Figure 19:
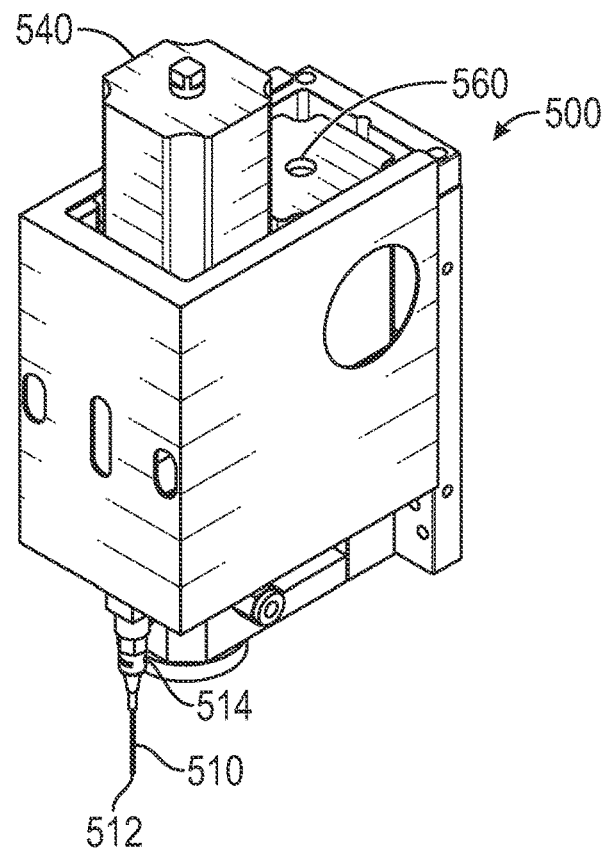
FIG. 19 illustrates a side elevational view of an injection pump.
Figure 20:
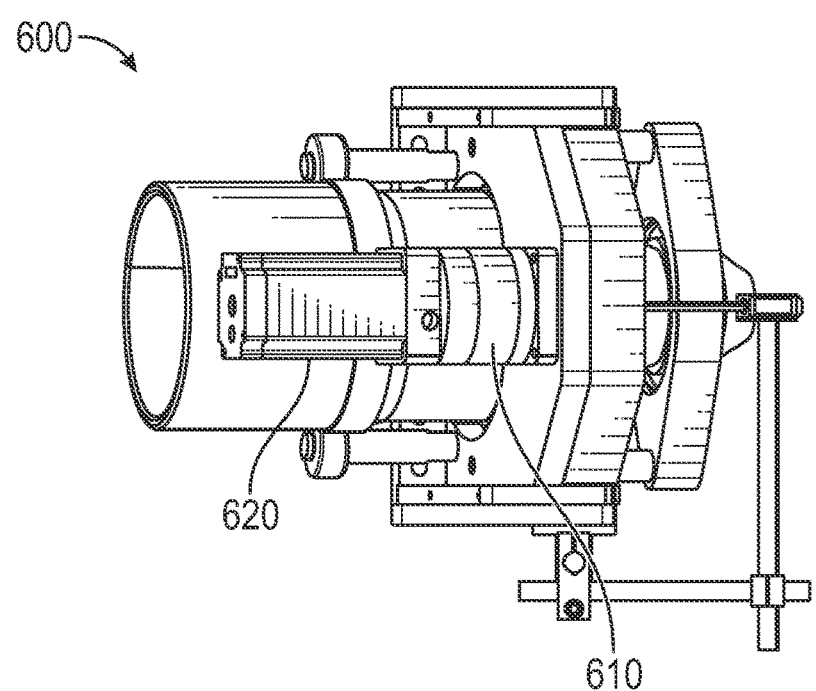
FIG. 20 illustrates a perspective view of a rotational solid loader.
Figure 22:
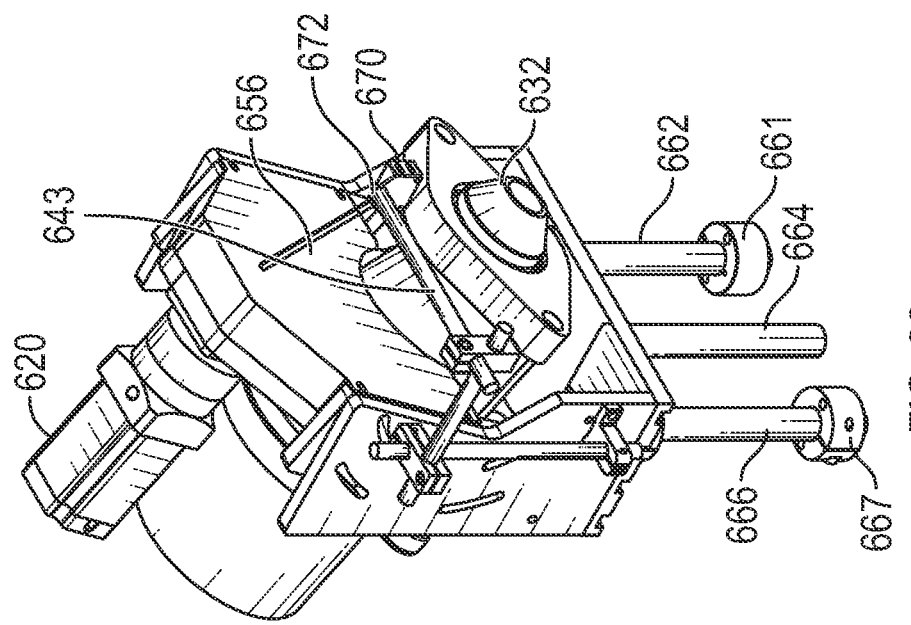
FIG. 22 illustrates another perspective view of a rotational solid loader.
Figure 21:
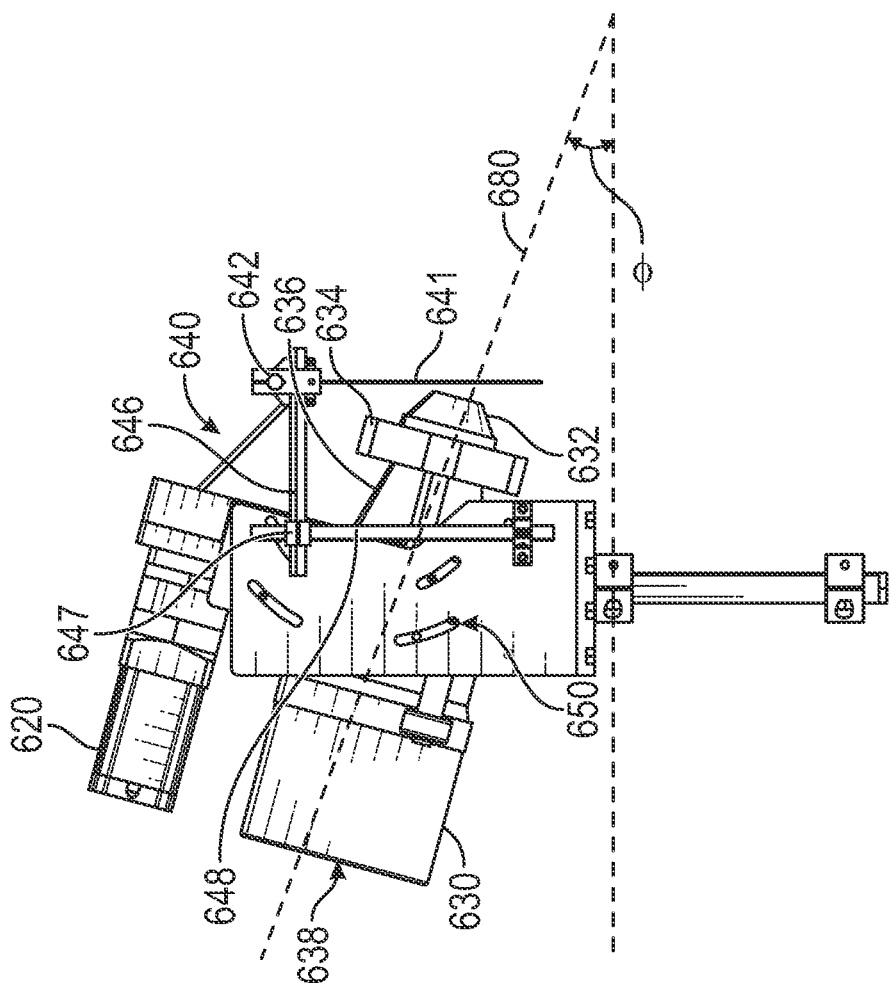
FIG. 21 illustrates a side elevational view of a rotational solid loader.

FIGS. 17-19 illustrates a perspective view of an injection pump 500. The injection pump can be coupled to a fluid reservoir designed to dispense fluids into container 800. The injection pump 500 can be connected to the fluid reservoir. The construction of the pump can be a piston-style system with a valve or any form of pump that delivers fluid accurately. As shown, the injection pump 500 includes a stepper motor 540 that drives a piston style system (hidden from view). The stepper motor 540 is coupled to mounting container 530. The injection pump 500 receives fluid through inlet 520 from the oil reservoir 100. The injection pump 500 includes a dispensing needle 510 that has an exit end 512 and a coupled end 514 that is coupled to the injection pump 500. The exit end 512 can take a variety of different shapes including a conical shape and flat shape. In the instance of a flat shape, the exit end 512 is substantially flat across in the direction perpendicular to the axial direction of the dispensing needle 510. The flat shape allows for certain types of fluid including terpenes to exit substantially in a stream like fashion in the direction that is substantially parallel to the dispensing needle 510, thereby eliminating a sideways direction compared to some possible exits from a conical shape end. For other fluids having different density and surface tension, the conical shape end can be used. Additionally, the injection pump 500 can include a pressure chamber 560 that is operable to provide pressure to the oil reservoir 100 to cause oil to flow to the injection pump 500.

FIGS. 20-24 illustrates a rotational solid loader 600. The solid loader 600 is operable to receive particles through a receiving end 638 and dispense particles through a dispensing end 632. The barrel 630 that holds the particles can be supported by collar 634 that is close to the dispensing end 632. The solid loader 600 is operable to deliver large amounts of solid particles and the conveyor 400 is operable to vibrate to evenly dispense a small and accurate amount of particles. As the dispensing of particles is limited to less than one gram in one example of the present disclosure, the small amounts need to be substantially less than 0.1 gram and in at least some instances on the order of 0.05 gram. In terms of large amounts, the weight of the particles can be on the order of 0.1 gram to over 2 grams. The solid loader 600 can includes a range finder 654 that can detect a height of the particles in the conveyor. The range finder 654 that can be included uses laser or other optical technology to determine the amount of particles that are dispensed through a dispensing end 632 into the conveyor 400.

As illustrated, the solid loader 600 assembly includes a range finder that points down at the trough 410. The range finder is to automatically actuate the movement the rotational loader to load more or less solid particulates. The controller 200 is operable to receive data indicative of the height of the particles and cause the solid loader 600 to dispense solid particles once the height of the particles is below a predetermined amount. For example, the predetermined amount for the height can be three times the average size of the particles. In other examples, the predetermined amount for the height can be five times the average size of the particles. When too many particles are dispensed, the conveyor 400 might load more than the desired amount. Furthermore, if too many particles are in the conveyor 400, the share might back up and become clogged.

The solid loader 600 includes a barrel 630 that has a conical dispensing end 632 and cylindrical receiving end 638, whereby particles are loaded into the cylindrical receiving end 638 and dispensed through the conical dispensing end 632. The conical dispensing end 632 can be coupled to the cylindrical receiving end 638 by a tapered portion 636. The tapered portion can be shaped like a funnel. In at least one example, the barrel 630 is removeable from the solid loader 600.

In at least one example, the solid loader 600 includes an adjustment apparatus 650 operable to control an angle ($\theta$) of the barrel centerline 680 relative to the conveyor 400. As illustrated, the adjustment apparatus 650 can be in the form of a plurality of screws that adjust an angle of the barrel 630 at two different points along its axis. In other examples, the adjustment apparatus 650 can take the form of powered adjustment devices that adjust the angle. The adjustment of the angle can be controlled by the controller when the power adjustment is provided. In at least one example, the barrel 630 can be made from a polymer material.

The barrel 630 can rotated by a stepper motor 620 to control the speed and amount dispensed therefrom. The stepper motor 620 can be coupled to a base plate 610 that in turn is coupled to the solid loader 600.

Figure 24:
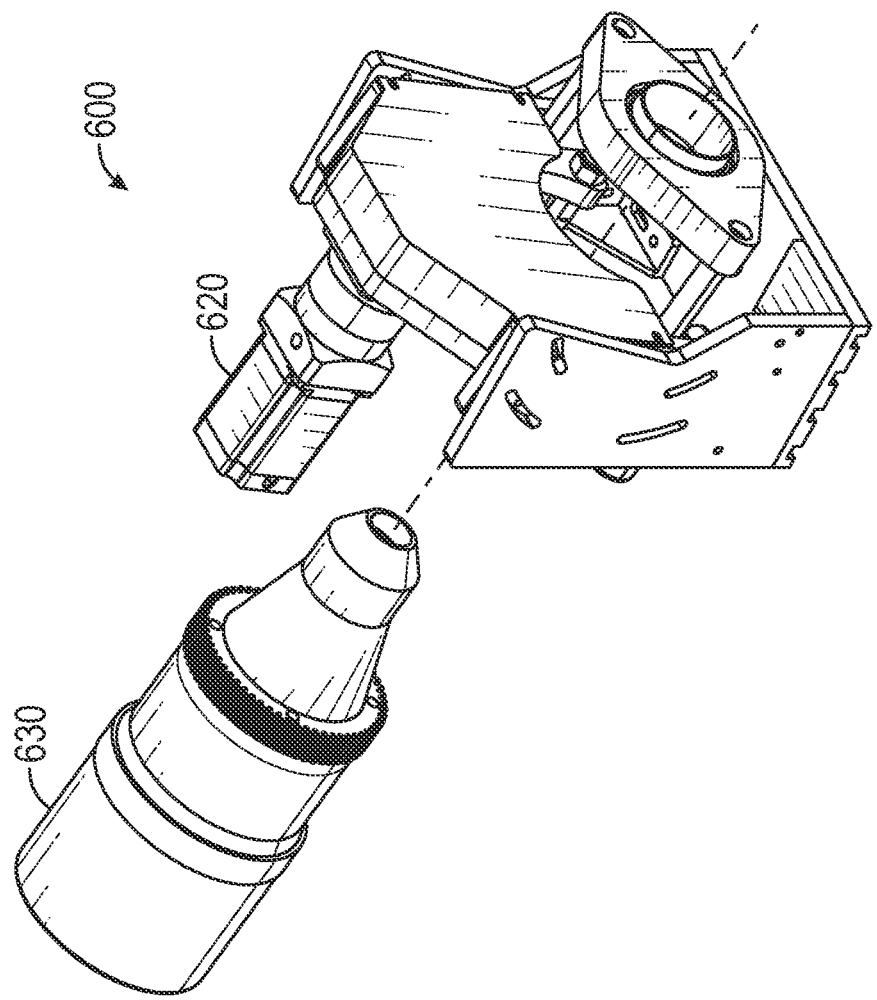
FIG. 24 illustrates a perspective view of a rotational solid loader with a barrel removed.
Figure 23:
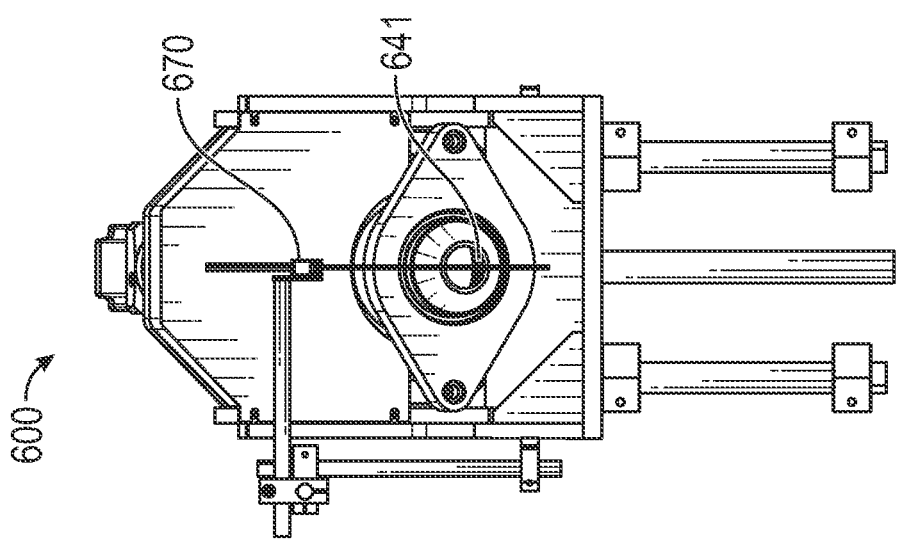
FIG. 23 illustrates a front elevational view of a rotational solid loader.

As seen in FIG. 24, the stepper motor 620 can be coupled to the barrel 630 by a corresponding set of gear teeth on the stepper motor 620 and the barrel 630.

The solid loader 600 also includes a height sensor 670 that is coupled to a mounting bracket 672 that is coupled to a plurality of suspension members 640, which are coupled to the solid loader 600. As illustrated the suspension members 640 can be coupled together by coupling members 642, 647. An upright suspension member 648, extends and joins to horizontal suspension member 646 at coupling member 647. The horizontal suspension member 646 joins to perpendicular member 643 at coupling member 642. Additionally the perpendicular member 643 can be coupled to cross member 645 that is coupled to the frame 656 of the solid loader 600. A downward member 641 can extend downwardly from the height sensor 670.

The solid loader 600 includes a plurality of legs 662, 664, 66 that are operable to be coupled to base 70. A first leg 662 includes a coupling collar 661 that allows it to be removable from a mounting member on the base 700. A second leg 666 also includes a mounting collar 667 that allows it to be coupled to the base 700.

Figure 26:
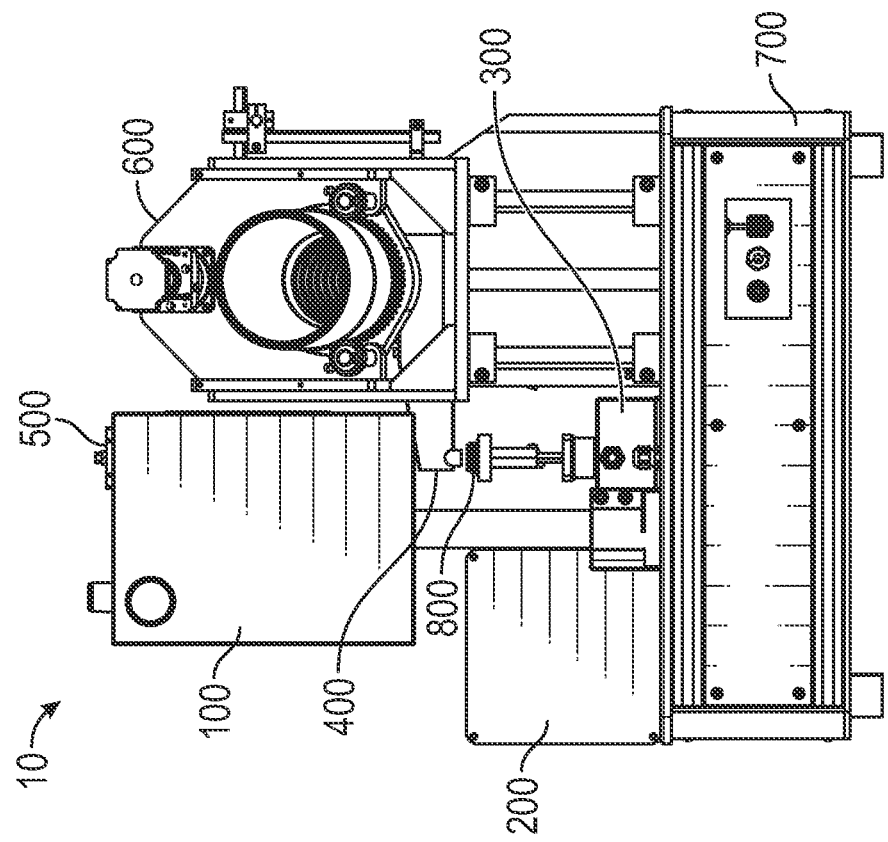
FIG. 26 illustrates a back elevational view of an example concentrate filling system assembly.
Figure 25:
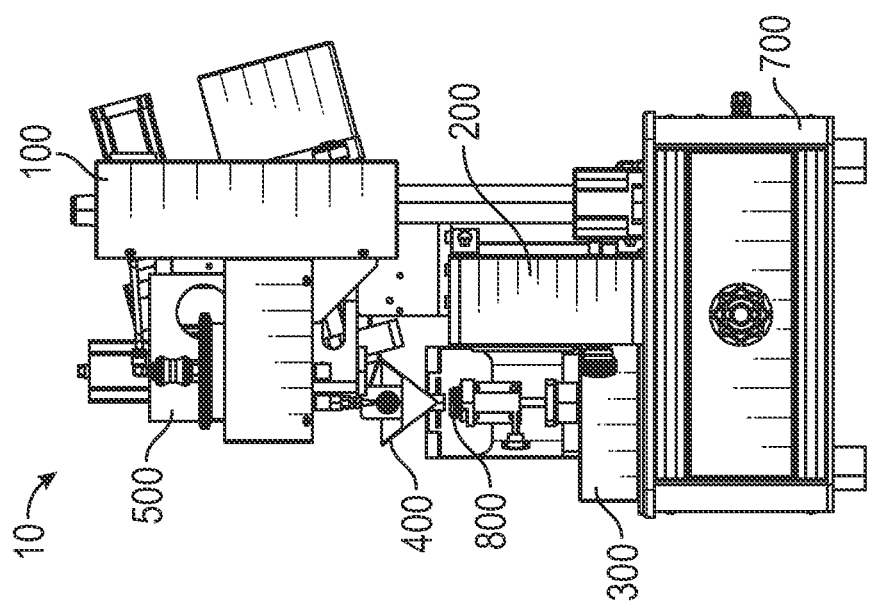
FIG. 25 illustrates a side elevational view of an example concentrate filling system assembly.
Figure 28:
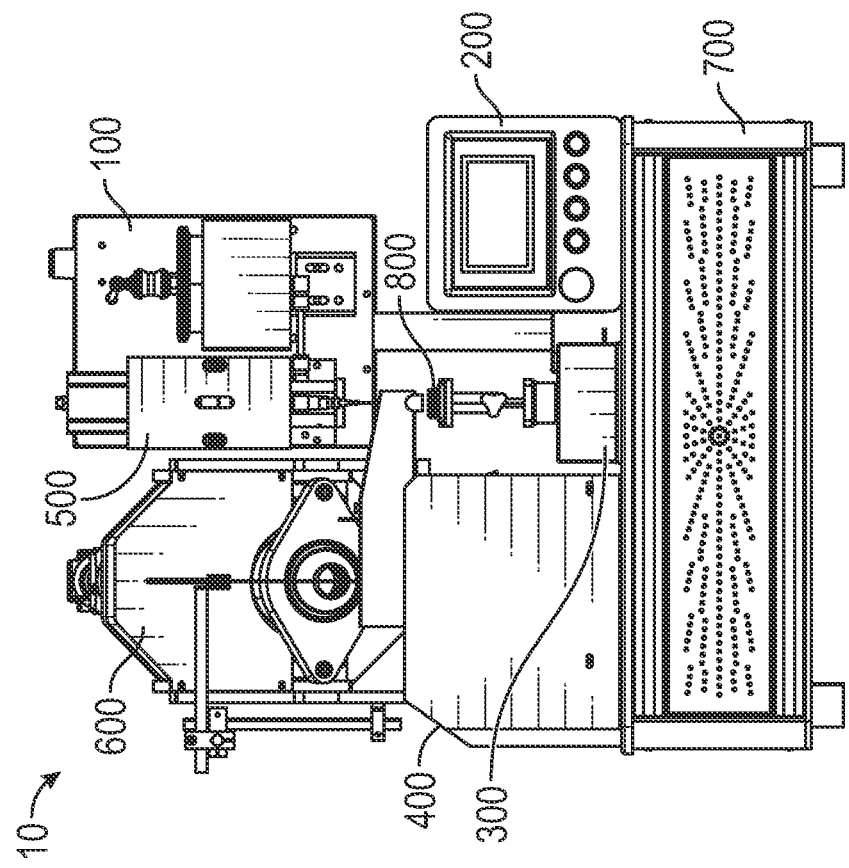
FIG. 28 illustrates a front elevational view of an example concentrate filling system assembly.
Figure 27:
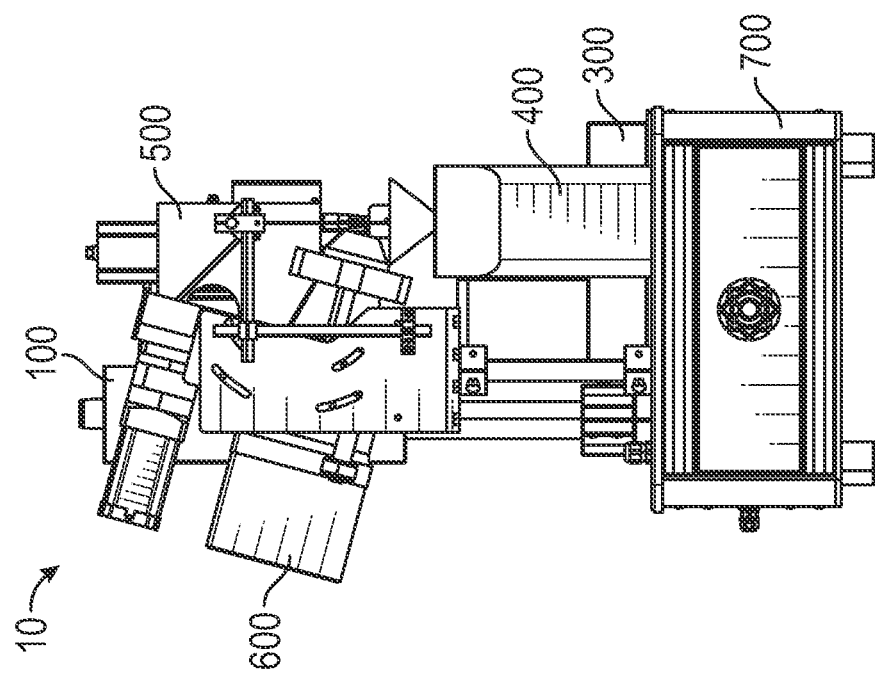
FIG. 27 illustrates a side elevational view of an example concentrate filling system assembly.

FIG. 25 illustrates an elevational view of an example concentrate filling system assembly. FIG. 26 illustrates a back elevational view of an example concentrate filling system assembly. FIG. 27 illustrates a side elevational view of an example concentrate filling system assembly. FIG. 28 illustrates a front elevational view of an example concentrate filling system assembly. The adjustable feet can be seen coupled to the base in the elevational views. The feet allow for the base to be adjusted thereby providing a level height for the load cell. If the load cell is not level, the weight measurements can be distorted. Thus, the base having adjustable feet provides for enhanced accuracy especially in the case where the load cell is configured to measure to the 0.001 gram.

While the above example shows implementation with a single oil reservoir 100, controller 200, solid loader 600, conveyor 400, container 800, load cell 300, and injection pump 500, the present technology can be implemented with a plurality of oil reservoirs, controllers, solid loaders, conveyors, containers, load cells, and/or injection pumps. In at least one example, a plurality of solid loaders are implemented whereby each of the solid loaders are operable to receive particles through a receiving end and dispense particles through a dispensing end, and the respective solid loaders receive particles of different sizes. This can allow for a desired filling of the container. In most implementations, a single container can be implemented such that the plurality of solid loaders dispense into a respective conveyer that in turn dispenses the particles into the container. In other implementations, a single conveyer can be used. In the implementation with separate conveyers it allows controlling the dispensing of the desired weight of the respective different sizes of particles.

An example for implementing the controller can include a computing device architecture. The components of the computing device architecture are in electrical communication with each other using a connection, such as a bus. The example computing device architecture includes a processing unit (CPU, microprocessor, and/or processor) 710 and a computing device connection that couples various computing device components including the computing device memory, such as read only memory (ROM) and random access memory (RAM), to the processor.

The computing device architecture can include a cache of high-speed memory connected directly with, in close proximity to, or integrated as part of the processor. The computing device architecture can copy data from the memory and/or the storage device to the cache for quick access by the processor. In this way, the cache can provide a performance boost that avoids processor delays while waiting for data. These and other modules can control or be configured to control the processor to perform various actions. Other computing device memory may be available for use as well. The memory can include multiple different types of memory with different performance characteristics. The processor can include any general purpose processor and a hardware or software service (e.g., service 1, service 2, and service 3) stored in storage device and configured to control the processor as well as a special-purpose processor where software instructions are incorporated into the processor design. The processor may be a self-contained system, containing multiple cores or processors, a bus, memory controller, cache, etc. A multi-core processor may be symmetric or asymmetric.

To enable user interaction with the computing device architecture, an input device can represent any number of input mechanisms, such as a microphone for speech, a touch-sensitive screen for gesture or graphical input, keyboard, mouse, motion input, speech and so forth. An output device can also be one or more of a number of output mechanisms known to those of skill in the art, such as a display, projector, television, speaker device. In some instances, multimodal computing devices can enable a user to provide multiple types of input to communicate with the computing device architecture. The communication interface can generally govern and manage the user input and computing device output. There is no restriction on operating on any particular hardware arrangement and therefore the basic features here may easily be substituted for improved hardware or firmware arrangements as they are developed.

Storage device is a non-volatile memory and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and hybrids thereof. The storage device can include service, service, and service for controlling the processor. Other hardware or software modules are contemplated. The storage device can be connected to the computing device connection. In one aspect, a hardware module that performs a particular function can include the software component stored in a computer-readable medium in connection with the necessary hardware components, such as the processor, connection, output device, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

While examples of the present inventive concept have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the disclosure described herein can be employed in practicing the disclosure. It is intended that the following claims define the scope of the disclosure and that methods and structures within the scope of these claims and their equivalents be covered thereby.

Illustrative examples of the disclosure include:

Aspect 1: An concentrate filling system comprising: a solid loader operable to receive particles and dispense particles through a dispensing end; a conveyor operable to receive the dispensed particles at a proximal end and further dispense particles at a distal end; a load cell operable to receive a container, wherein the container receives the dispensed particles from the conveyor; an injection pump coupled to a fluid reservoir designed to dispense fluids into the container; a controller having one or more microprocessors, the controller operable to receive data from the load cell indicative of a weight of the particles and/or fluid and send a control signal to the conveyor to adjust the dispensing of the particles and send a control signal to the injection pump; wherein upon receiving indicative of a predetermined weight of the container, fluid, and particles the controller is operable to send a control signal to the conveyor and the injection pump to stop dispensing of particles and fluid.

Aspect 2: The concentrate filling system of Aspect 1, wherein the solid loader is operable to deliver large amounts of solid particles are dispensed and the conveyor is operable to vibrate to evenly dispense a small and accurate amount of particles.

Aspect 3: The concentrate filling system of Aspect 1, wherein the solid loader is operable to deliver amounts of solid particles on order of between 0.1 grams and 1 gram.

Aspect 4: The concentrate filling system of Aspect 1, wherein the solid loader includes a range finder that can detect a height of the particles in the conveyor.

Aspect 5: The concentrate filling system of Aspect 4, wherein the controller is operable to receive data indicative of the height of the particles and cause the solid loader to dispense solid particles once the height of the particles is below a predetermined amount.

Aspect 6: The concentrate filling system of Aspect 1, wherein the solid loader includes a barrel that has a conical dispensing end and cylindrical receiving end, whereby particles are loaded into the cylindrical receiving end.

Aspect 7: The concentrate filling system of Aspect 6, wherein the barrel is removeable from the solid loader.

Aspect 8: The concentrate filling system of Aspect 7, further comprising an adjustment apparatus operable to control an angle of the barrel relative to the conveyor.

Aspect 9: The concentrate filling system of Aspect 6, wherein the barrel is made from a polymer material.

Aspect 10: The concentrate filling system of Aspect 6, wherein the barrel is rotated by a stepper motor to control speed and amount dispensed therefrom.

Aspect 11: The concentrate filling system of Aspect 1, wherein the conveyor can be configured with a rod designed to break up and disperse large clumps or particles.

Aspect 12: The concentrate filling system of Aspect 1, wherein the conveyor is operable to vibrate thereby causing particles inside the conveyor to travel down a length to a dispensing port and into a container.

Aspect 13: The concentrate filling system of Aspect 12, further comprising a vibrational controller that is operable to change a vibrational frequency of the conveyor so that the conveyor can vibrate at different frequencies.

Aspect 14: The concentrate filling system of Aspect 12, wherein the vibrational controller is integrated with the controller and adjusts a vibrational frequency in dependence upon a detected weight at the load cell.

Aspect 15: The concentrate filling system of Aspect 1, wherein the load cell can be configured with different attachment dies designed to properly seat different containers on the load cell.

Aspect 16: The concentrate filling system of Aspect 1, further comprising a plurality of feet that are operable to be adjusted thereby leveling the load cell.

Aspect 17: The concentrate filling system of Aspect 1, wherein the load cell is operable to move in response to one or more signals from the controller and take additional measurements as fluid is dispensed from the injection pump and send additional measurement data to the controller, which is operable to determine a density of a mixture in the container.

Aspect 18: The concentrate filling system of Aspect 9, wherein the movement of the load cell is a series of four strokes.

Aspect 19: An concentrate filling system comprising: a plurality solid loaders operable to receive particles and dispense particles through a dispensing end, wherein each solid loader receives particles of a different size; a plurality of conveyors operable to receive the dispensed particles, from a respective one of the plurality of solid loaders, at a proximal end and further dispense particles at a distal end; a load cell operable to receive a container, wherein the container receives the dispensed particles from the conveyor; a controller having one or more microprocessors, the controller operable to receive data from the load cell indicative of the weight of the particles and send a control signal to the conveyor to adjust the dispensing of the particles; wherein upon receiving indicative of a predetermined weight of the container and particles the controller is operable to send a control signal to the conveyor to stop dispensing of particles.

What is claimed is:

1. An concentrate filling system comprising:
    a solid loader operable to receive particles at a receiving end and dispense particles through a dispensing end, wherein the solid loader includes a barrel that is rotated by a stepper motor to control speed and amount dispensed therefrom;
    a conveyor operable to receive the dispensed particles at a proximal end and further dispense particles at a distal end;
    a load cell operable to receive a container, wherein the container receives the dispensed particles from the conveyor;
    an injection pump coupled to a fluid reservoir designed to dispense fluid into the container;
    a controller having one or more microprocessors, the controller operable to receive data from the load cell indicative of a weight of the particles and/or fluid and send a control signal to the conveyor to adjust the dispensing of the particles and send a control signal to the injection pump;
    wherein upon receiving indicative of a predetermined weight of the container, fluid, and particles the controller is operable to send a control signal to the conveyor and the injection pump to stop dispensing of particles and fluid.

2. The concentrate filling system of claim 1, wherein the solid loader is operable to deliver large amounts of solid particles are dispensed and the conveyor is operable to vibrate to evenly dispense a small and accurate amount of particles.

3. The concentrate filling system of claim 1, wherein the solid loader is operable to deliver amounts of solid particles on order of between 0.1 grams and 1 gram.

4. The concentrate filling system of claim 1, wherein the solid loader includes a range finder that can detect a height of the particles in the conveyor.

5. The concentrate filling system of claim 4, wherein the controller is operable to receive data indicative of the height of the particles and cause the solid loader to dispense solid particles once the height of the particles is below a predetermined amount.

6. The concentrate filling system of claim 1, wherein the barrel has a conical dispensing end and cylindrical receiving end, whereby particles are loaded into the cylindrical receiving end.

7. The concentrate filling system of claim 6, wherein the barrel is removeable from the solid loader.

8. The concentrate filling system of claim 7, further comprising an adjustment apparatus operable to control an angle of the barrel relative to the conveyor.

9. The concentrate filling system of claim 6, wherein the barrel is made from a polymer material.

10. The concentrate filling system of claim 9, wherein the movement of the load cell is a series of four strokes.

11. The concentrate filling system of claim 1, wherein the conveyor can be configured with a rod designed to break up and disperse large clumps or particles.

12. The concentrate filling system of claim 1, wherein the conveyor is operable to vibrate thereby causing particles inside the conveyor to travel down a length to a dispensing port and into a container.

13. The concentrate filling system of claim 12, further comprising a vibrational controller that is operable to change a vibrational frequency of the conveyor so that the conveyor can vibrate at different frequencies.

14. The concentrate filling system of claim 13, wherein the vibrational controller is integrated with the controller and adjusts a vibrational frequency in dependence upon a detected weight at the load cell.

15. The concentrate filling system of claim 1, wherein the load cell can be configured with different attachment dies designed to properly seat different containers on the load cell.

16. The concentrate filling system of claim 1, further comprising a plurality of feet that are operable to be adjusted thereby leveling the load cell.

17. The concentrate filling system of claim 1, wherein the load cell is operable to move in response to one or more signals from the controller and take additional measurements as fluid is dispensed from the injection pump and send additional measurement data to the controller, which is operable to determine a density of a mixture in the container.

* * * * *